(12) United States Patent
Lemchen

(10) Patent No.: US 11,382,723 B2
(45) Date of Patent: Jul. 12, 2022

(54) PEEL AWAY PRINTED METAL ORTHODONTIC ASSEMBLIES

(71) Applicant: Marc Lemchen, New York, NY (US)

(72) Inventor: Marc Lemchen, New York, NY (US)

( * ) Notice: Subject to any disclaimer, the term of this patent is extended or adjusted under 35 U.S.C. 154(b) by 281 days.

(21) Appl. No.: 16/809,383

(22) Filed: Mar. 4, 2020

(65) Prior Publication Data

US 2020/0405451 A1   Dec. 31, 2020

Related U.S. Application Data

(60) Provisional application No. 62/867,137, filed on Jun. 26, 2019.

(51) Int. Cl.
  *A61C 7/18*   (2006.01)
  *A61C 7/00*   (2006.01)
  *B33Y 80/00*  (2015.01)

(52) U.S. Cl.
  CPC ............... *A61C 7/18* (2013.01); *A61C 7/002* (2013.01); *B33Y 80/00* (2014.12)

(58) Field of Classification Search
  CPC ............ A61C 7/18; A61C 7/002; B33Y 80/00
  See application file for complete search history.

(56) References Cited

U.S. PATENT DOCUMENTS

| | | | | |
|---|---|---|---|---|
| 1,794,213 A * | 2/1931 | Spahn | ...................... | A61C 7/12 433/23 |
| 2,790,238 A * | 4/1957 | Trangmar | ................ | A61C 5/85 433/39 |
| 3,513,545 A * | 5/1970 | Miller | ....................... | A61C 7/12 433/23 |
| 3,990,151 A * | 11/1976 | Kesling | .................. | A61C 7/282 433/23 |
| 5,330,353 A * | 7/1994 | Wavrin | ..................... | A61C 5/85 433/226 |
| 5,338,191 A * | 8/1994 | Hamula | .................... | A61C 7/18 433/23 |
| 5,730,592 A * | 3/1998 | Meyer | ....................... | A61C 5/85 433/39 |
| 9,877,802 B2 * | 1/2018 | McDonald | ............... | A61C 5/85 |
| 2003/0124480 A1 * | 7/2003 | Peacock, III | ............. | A61C 7/18 433/23 |

(Continued)

*Primary Examiner* — Jacqueline T Johanas
*Assistant Examiner* — Lina Faraj
(74) *Attorney, Agent, or Firm* — Marcus C. Dawes; Daniel L. Dawes

(57) ABSTRACT

An orthodontic apparatus includes a printed assembly conforming to the tooth with a separation line or zone defined therein having a configuration adapted to facilitate removal of the printed assembly. The separation zone or line takes the form of a slit, slot, serration, thinned indentation, a horizontal or vertical separation line or zone or a combination thereof, and an open slot defined in a cross configuration into the printed assembly with a vertical slot and intersecting horizontal slot, the vertical slot extending to the lower edge of the assembly. The assembly includes at least two separate portions, a buccal portion and a lingual portion conformed to the tooth, the separation line or zone being defined on at least one of the two separate portions. A three dimensional structural fixture may also be defined in the printed assembly for engagement with a tool.

9 Claims, 5 Drawing Sheets

(56) References Cited

U.S. PATENT DOCUMENTS

| | | | |
|---|---|---|---|
| 2004/0101799 A1* | 5/2004 | Stadtmiller | A61C 7/18 433/17 |
| 2009/0208896 A1* | 8/2009 | Clark | A61C 5/50 433/215 |
| 2010/0227290 A1* | 9/2010 | Hameiri | A61C 7/18 433/23 |
| 2011/0189629 A1* | 8/2011 | Kilcher | A61C 5/85 433/226 |

* cited by examiner

PEEL AWAY PRINTED METAL ORTHODONTIC ASSEMBLIES

RELATED APPLICATIONS

The present application is a nonprovisional of U.S. provisional application Ser. No. 62/867,137, filed on Jun. 26, 2019 which is incorporated herein by reference and to which priority is claimed pursuant to 35 USC 119.

BACKGROUND

Field of the Technology

The invention relates to the field of orthodontic dentistry and in particular to the design and use of removable orthodontic assemblies fabricated as printed metal assemblies.

Description of the Prior Art

An orthodontic assembly is a thin strip of metal, cemented to the crown of a tooth, to which wires are attached in order to reposition teeth. After the treatment is finished or the configuration of orthodontic forces are changed during the treatment, it is necessary to remove the assemblies affixed to the teeth. Since the affixation is meant to permanent, or nearly permanent, it is often difficult to loosen and remove the assemblies.

Currently, orthodontic assemblies are produced using a three dimensional scan of the tooth to which they are fitted. These are called laser sintered assemblies (LSB). The metals from which the LSB is made is typically stiff and has limited malleability. It is not easily bent and generally cannot be easily peeled off the tooth whole. In fixing an LSB to a tooth the enamel is prepared in the areas to which the appliance will be bonded by a prophy etch, rinse and dry using standard phosphoric acid etch. The lingual, buccal and the surface just over the occlusal edge of the tooth are etched. Assure Universal Bonding Resin® or Assure Plus®, trademarks of Dentspy Sirona Inc. of York, Pa., is applied to on the etched enamel surface only without a light cure. The appliance needs no preparation and typically will already be microetched from the lab. Use of Ultra Bandlok® paste of G&H Orthodontics, Franklin, Ind., is one possible choice among many as it chemically bonds to the metal bonding base of the appliance. A thin coat of paste is applied to the inside of the assembly making sure all areas are covered. If there is an excess of paste flash after seating the appliance, the paste is light cured for 1-2 seconds and the excess removed in a putty type state. Then the paste is light cured moving the light source in a slow circle over the top of the assembly for 40 seconds.

Often, if the appliance has a limited amount of bonded area it can be removed with a "band removing plier" or something similar. However, where the bond strength is so strong a practitioner can be forced to cut the appliance into pieces to remove it. The amount of pressure required to remove the appliance in one piece can be extreme. Thus, to remove the LSBs from the teeth it is sometimes necessary to sever the LSB or cut it into pieces using a drill and to remove each piece separately. The orthodontist determines by arbitrary choice and experimentation how to best cut the LSB into pieces for removal.

What is needed is a more reliable and more easily manipulated design for removal of orthodontic assemblies than those requiring cutting methods currently employed.

BRIEF SUMMARY

The illustrated embodiment of the invention includes an orthodontic assembly with horizontal, vertical or predefined lines or zones of separation, score lines, slots, slits, serrated lines or any other means now known or later devised to facilitate separation along a predefined line in a printed metal assembly to facilitate its easy removal when required. It is increasingly the case that orthodontic practitioners and labs are making printed metal orthodontic appliances. The biggest challenge is to remove the assemblies comfortably or expeditiously. To facilitate this, the appliances are printed with horizontal and vertical slits. These areas can be thin, or preferably extend through the material to the tooth surface. The slit can extend through the occlusal, gingival, or both margins of the printed assembly. "Separation lines" or more descriptively, separation areas are zones where the material is printed with a reduced thickness or other structural configurations to allow the material to easily bend, tear or fracture in those areas, thereby facilitating removal. The printed metal assembly is formed of what is called matrix material, thin metal, typically stainless steel formed around a tooth or premade, presized assembly or printed assembly to fit on a tooth. In the preferred embodiment the printed assembly does not extend interproximally between adjacent teeth, but conformally fits the tooth in a lingual and buccal part or portion.

Thus the orthodontic assembly includes a printed metal assembly arranged and configured for attachment to a tooth for an orthodontic procedure; and at least one separation or score line defined in the printed metal assembly to facilitate selective removal of the assembly or a portion thereof from the tooth when desired. The slits will facilitate the removal by creating: 1) areas of weakened adhesion; or 2) a slit which the orthodontist can lengthen through the occlusal or gingival margins or extend horizontally reducing the time and difficulty of sectioning the appliance if still necessary. The horizontal slits also provide a "catch" for the band removing pliers to engage to allow the appliance to be removed.

In summary, the illustrated embodiments of the invention are directed to an orthodontic apparatus for attaching to a tooth including: a printed assembly made to conform to the tooth, a separation line or zone defined in the printed assembly having a configuration adapted to facilitate removal of the printed assembly from the tooth; and an orthodontic fixture attached to or integral with the printed assembly to enable it use in an orthodontic procedure.

The separation line or zone includes: a slit defined into the printed assembly; a slot defined into the printed assembly a serration defined into the printed assembly; a thinned indentation line defined into the printed assembly; a horizontal or vertical separation line or zone or a combination thereof; an open slot defined in a cross configuration into the printed assembly with a vertical slot and intersecting horizontal slot, the vertical slot extending to the lower edge of the assembly; a buccal portion conformed to the tooth and a lingual portion conformed to the tooth, the separation line or zone being defined on at least one of the two separate portions; a multiple of separate separation zones or lines are defined in the assembly which are parallel horizontal zones or lines, parallel vertical zones or lines, or a combination thereof.

The orthodontic apparatus further includes at least one three dimensional structural fixture defined in the printed assembly for engagement with a tool to facilitate removal of the printed assembly from the tooth. The orthodontic apparatus may be configured to be removed by means of pliers and where the three dimensional structural fixture defined in the printed assembly for engagement with a tool to facilitate removal of the printed assembly from the tooth comprises a lip for engagement with the pliers or the three dimensional structural fixture defined in the printed assembly for engagement with a tool to facilitate removal of the printed assembly from the tooth comprises an indent for engagement with the pliers.

The scope of the illustrated embodiments of the invention also extend to a method of removing a printed assembly included as part of an orthodontic apparatus attached to and conformed to a tooth including the steps of manipulating a separation line or zone predefined in a printed assembly disposed on the tooth to detach at least part of the printed assembly from the tooth by separating the part of the printed assembly along the separation line or zone, and removing the separated part of the printed assembly from the tooth.

The step of manipulating a separation line or zone predefined in the printed assembly opens the printed assembly to allow the printed assembly to be detached and lifted off the tooth.

The step of manipulating a separation line or zone predefined in the printed assembly disassembles the printed assembly into separate portions, each of which are separately removed from the tooth.

The step of manipulating a separation line or zone predefined in the printed assembly opens the printed assembly to allow the printed assembly to be detached and lifted off the tooth and disassembles the printed assembly into separate portions, each of which are separately removed from the tooth.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

FIG. 4 is diagram of an upper arch on which assemblies on opposing teeth with an appliance bar disposed between.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
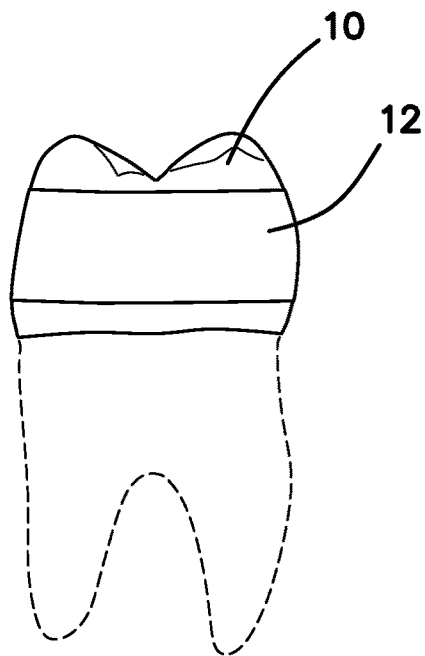
FIG. 1 is a diagram of a prior art assembly on a tooth.

FIG. 1 is a diagram of prior art assembly 12 disposed on a tooth 10. The assembly 12 is continuous and of uniform thickness and cross-section around its entire surface. Brackets or other orthodontic appliance elements (not shown) are typically affixed to the assembly so that the corrective force is applied to tooth 10 to move it or anchor to it.

Figure 2:
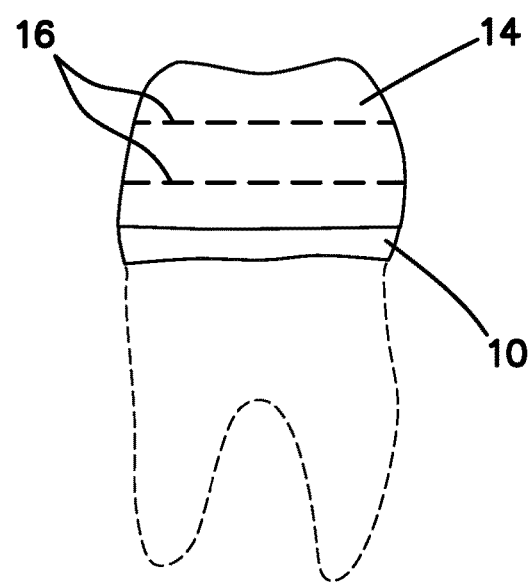
FIG. 2 is a side view of an assembly devised according to the invention as applied to a tooth.

FIG. 2 is a side elevational view of assembly 14 of one the illustrated embodiments of the invention in which assembly 14 is manufactured out of printed metal with one or more serrations, score lines or contiguous patterns 16 of thinned material alone which it can be bent, torn or separated in such a manner as to facilitate its removal from tooth 10. The tooth 10 to which assembly 14 will be attached is scanned by conventional optical three dimensional imaging to obtain the three dimensional form of the tooth 10. Using the scanned shape and size, a metal printer is programmed to print a metal assembly comprised of a buccal and lingual portion 18 to custom fit to tooth 10. The surface of tooth 10 is prepared in a conventional manner to accept assembly 14, coated with a light-cured adhesive and assembly 14 is fitted to tooth 10.

Figure 3:
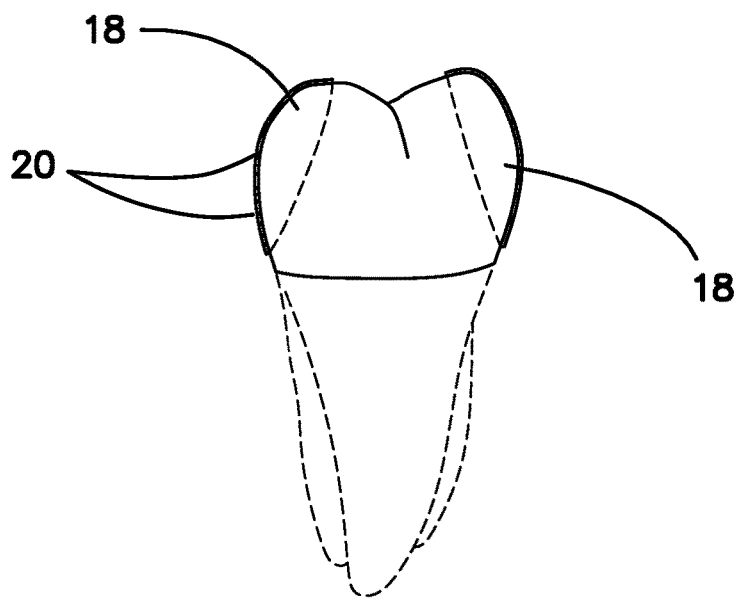
FIG. 3 is a side view of the assembly of FIG. 2 as seen from an orthogonal direction.

FIG. 3 is a side view diagram of a tooth 10 of FIG. 2 on which a segmented printed metal assembly 18 has been made and applied. One side of assembly 18 has horizontal score lines 20 defined therein while the opposing side has none. Assembly 14 extends only partially around tooth 10 with a buccal portion and an opposing lingual portion, each of which are formed to conform to the specific contours of the tooth and side of the tooth to which they are attached. The printed metal assembly 18 is therefore printed to conform specifically to the particular tooth to which it is or will be attached and to the selected side of that tooth. As shown in FIG. 3 there is no continuous interproximal extension of assembly 18 between adjacent teeth.

Figure 4:
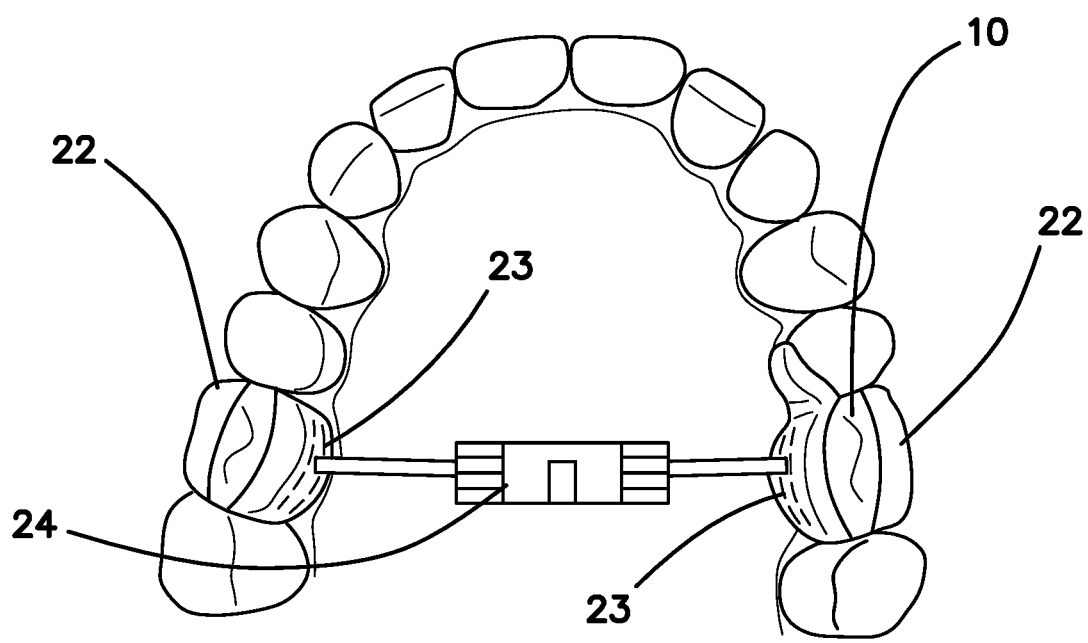

FIG. 4 is a diagram of an upper arch or palatal view of teeth 10 on which a pair of printed assemblies 22 including separation zones 23 of which the lingual side is shown in FIG. 4, have been disposed on opposing pairs of teeth 10 with an orthodontic bar or appliance 24 disposed therebetween. In this embodiment assemblies 22 are applied to directly opposing pairs of teeth on the dental arch and partially circumscribe portions of two adjacent teeth in each opposing pair.

Figure 5:
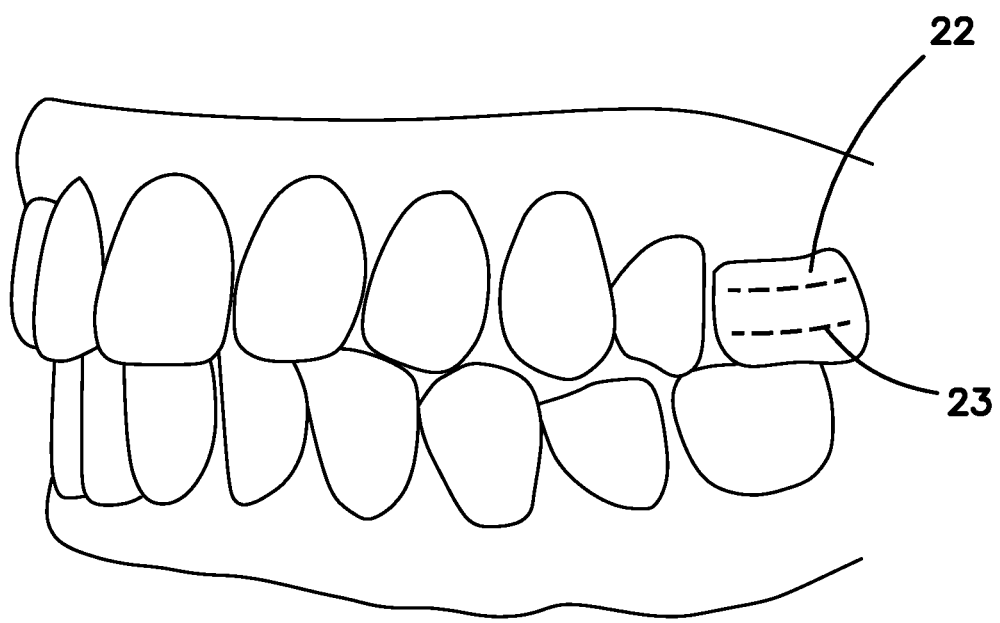
FIG. 5 is a diagram of the assemblies of FIG. 4 as seen from the buccal side.
Figure 6:
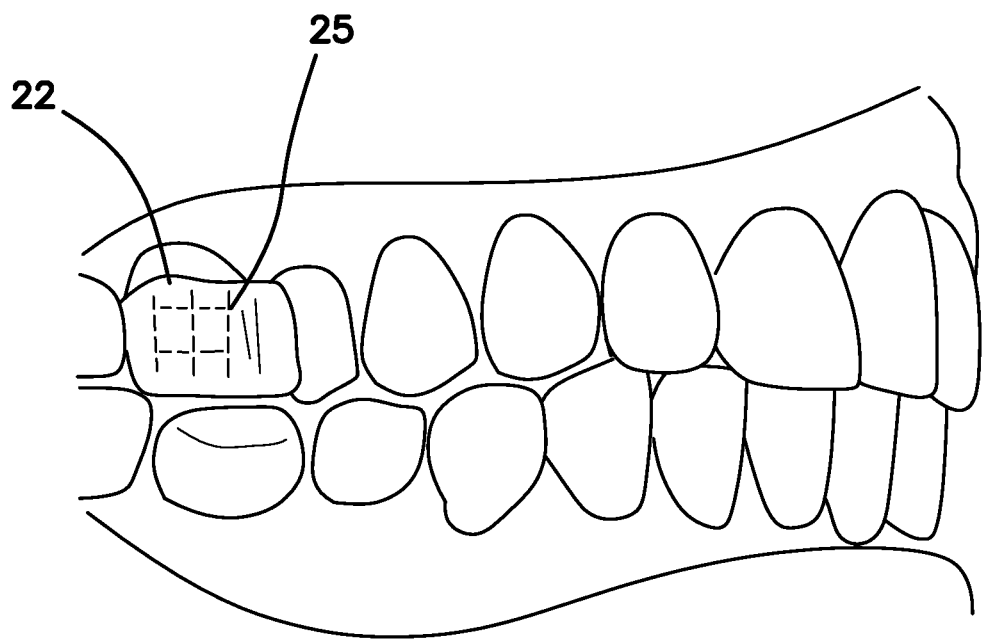
FIG. 6 is a diagram of the buccal side of the opposing teeth and assemblies of FIG. 4.
Figure 11:
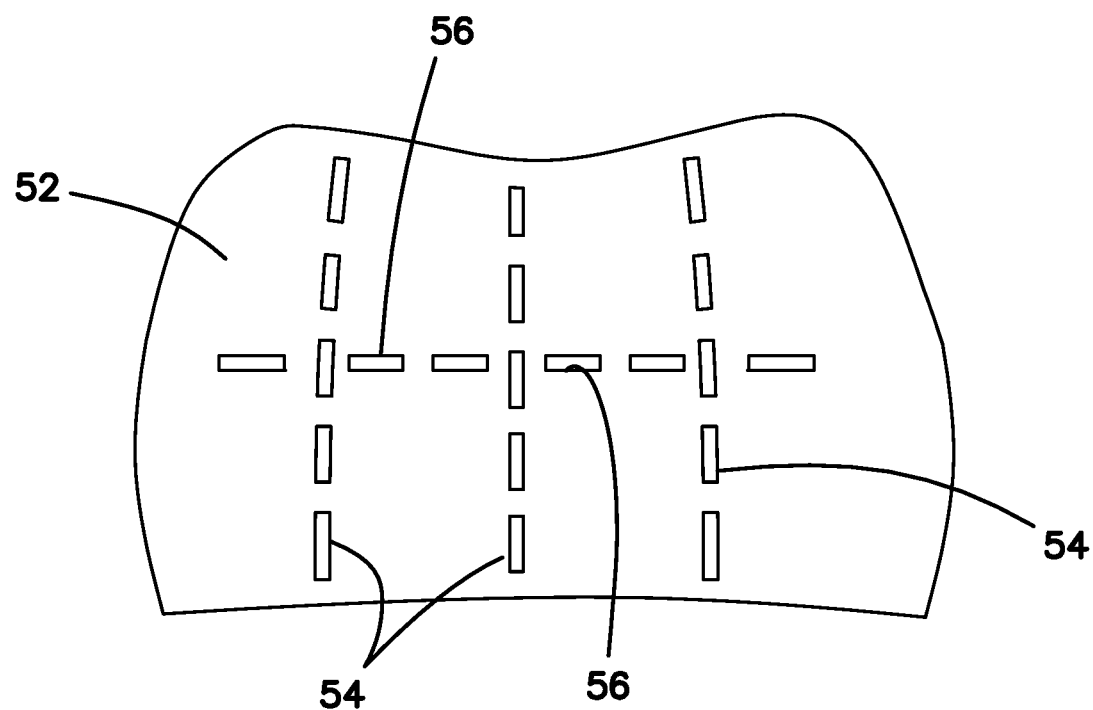
FIG. 11 is a side elevational view of tooth to which an assembly is attached in which a plurality of small horizontally oriented openings and vertically oriented openings are formed in assembly in a pattern of a plurality of intersecting horizontal and vertical lines defining horizontal and vertical serration zones.

Buccal views of assembly 22 are provided in FIG. 5 showing horizontal zones of separation 23 and FIG. 6 a serrated pattern 25 of separation like that shown in more detail in FIG. 11. Assemblies 22 are formed to include separations or gaps in the assembly 22 so that the entire circumferential surface of the tooth is not enclosed in assembly 22 although the buccal and lingual portion may be joined by thin straps which can later be drilled apart, thereby facilitating its removal by opening the gap.

Figure 7:
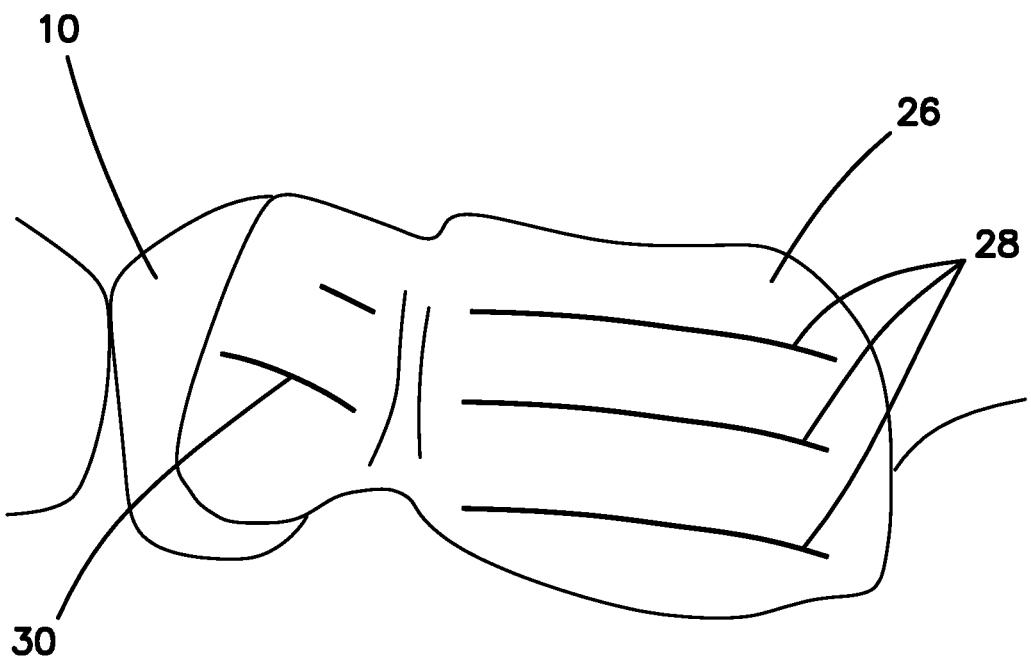
FIG. 7 is a diagram of the buccal side of a conventional LSB, which has been marked to show where score lines of thinning is formed as part of the printed assembly.

FIG. 7 is a diagram of the buccal side of a lingual side assembly 26, which has been marked to show where score lines 28 and 30 of thinning is formed as part of the printed assembly. The score lines 28 and 30 in this embodiment are shown as substantially horizontal, but they may be defined in any direction to facilitate removal of the assembly 26, and may be continuous across multiple teeth 10 or may be segmented into discontinuous score lines 28 adjacent a second sore line 30. Here, assembly 26 is bonded to one tooth 10, completely encompassing the buccal side and partially clasping the adjacent tooth 10. Assembly 26 can then be peeled, broken or torn apart on the score lines 28 and 30 without the need to break the bonding and remove assembly 26 in one movement or attempt.

Figure 8:
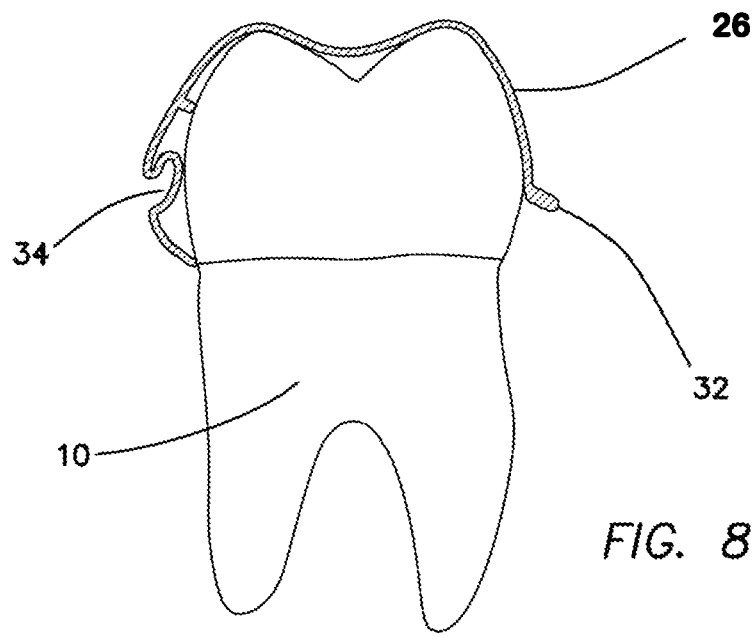
FIG. 8 is a side cross sectional view of an assembly on a tooth, which assembly is provided with a lip, tab and/or indentation to facilitate engagement with a tool to bend, tear, fracture or manipulate the assembly relative to the tooth.

The illustrated embodiments of the invention include an assembly 26 as shown in FIG. 8 on tooth 10 having also a small lip or tab 32 or engagement indentation 34 on the gingival margin or gum side edge in one or more locations on assembly 26 to facilitate engagement by a custom tool or traditional assembly removal plier to bend, tear, fracture or otherwise manipulate assembly 26. For example, if assembly 26 is printed to include multiple tear zones, each zone may be provided with such a lip or tab 32 and/or indentation 34 to allow bending, tearing, fracturing or manipulating of the corresponding zone of assembly 26.

Figure 9:
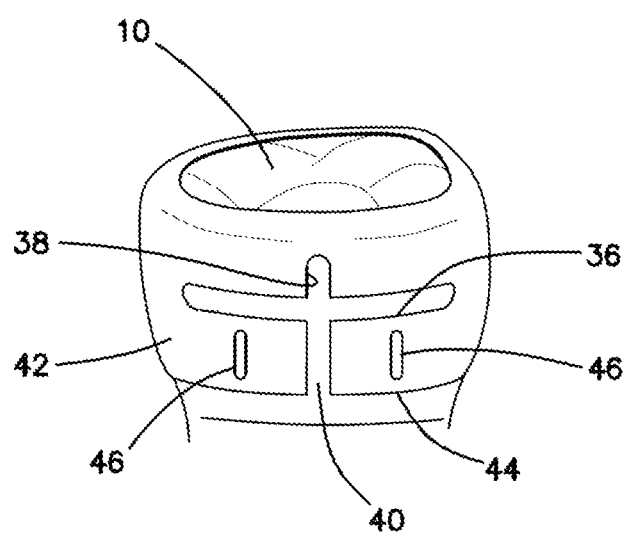
FIG. 9 is a side elevational view of a tooth on an assembly is provided with a compound separation line shown as an open slot in the form of a cross open on the bottom edge of the assembly.

FIG. 9 is a side elevational view illustration of tooth 10 to which an assembly 42 is attached. Assembly 42 may partially cover the occlusal surface of tooth 10 in a complete encirclement. The interproximal surface of assembly 42, not shown in FIG. 9, is then provided with an open slot defined from and including the gum line up to, but not including the partial occlusal encirclement. An open slot in the compound configuration of a cross is defined in assembly 42 with a horizontal slot 36 intersecting a vertical slot 38, which extends to the bottom edge 44 of assembly 42 to provide an opening 40. In this manner assembly 42 which is printed to conform to tooth 10 can be easily opened up, lifted off, broken off, or peeled off tooth 10 using conventional dental tools. Assembly 42 may completely encircle tooth 10 or may be provided in separate buccal and lingual portions, or provided with the open slot-cross configuration on each side of assembly 42. One or more orthodontic fixtures or brackets 46 may be attached to assembly 42 to allow its use in conventional orthodontic procedures for alignment or movement of teeth.

Figure 10:
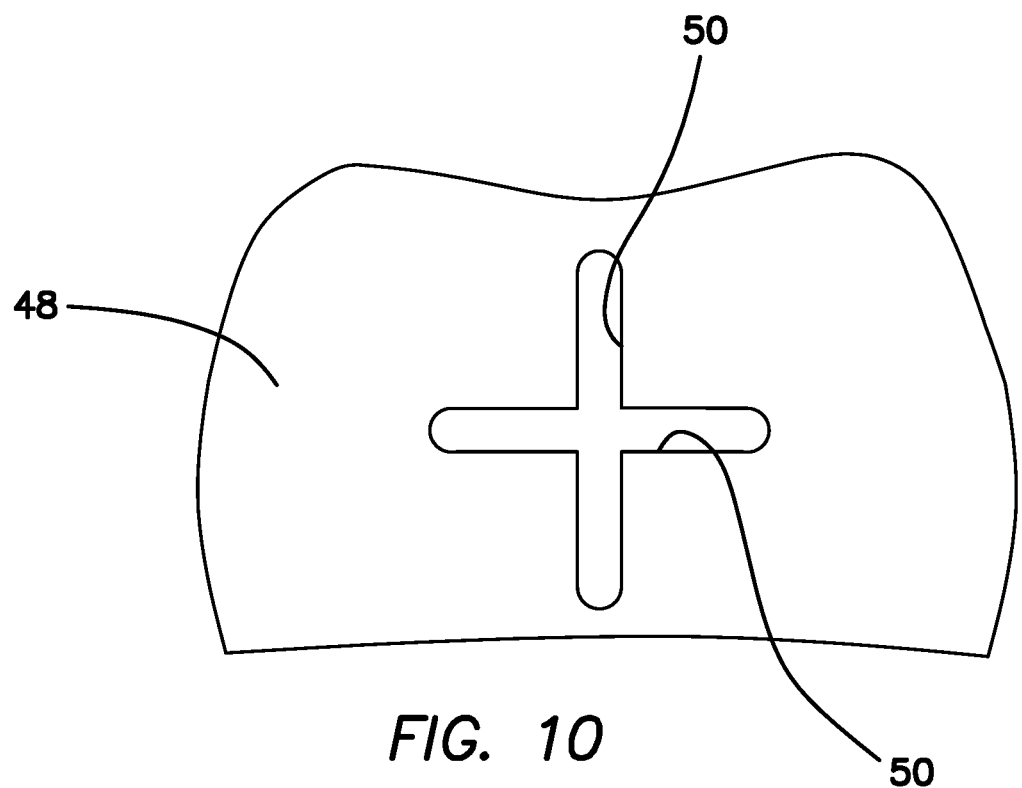
FIG. 10 is a side elevational view of tooth to which an assembly is attached in which horizontal and vertical slots intersect orthogonally in the midportion of the side of assembly for a "plus sign" pattern.

FIG. 10 is a side elevational view of tooth 10 to which an assembly 48 is attached. In this embodiment the horizontal and vertical slots 50 intersect orthogonally in the midportion of the side of assembly 48 for a "plus sign" pattern. To remove assembly 48 slots 50 are cut through using a drill to the occlusal and gingival edges of assembly 48 and then pliers are used to horizontally engage assembly 48 to remove it from the tooth 10.

FIG. 11 is a side elevational view of tooth 10 to which an assembly 52 is attached. In this embodiment a plurality of small horizontally oriented openings 56 and vertically oriented openings 54 are formed in assembly 52 in a pattern of a plurality of intersecting horizontal and vertical lines defining horizontal and vertical serration zones. Assembly 52 is cut through using a drill to connect openings 54 and 56 to render assembly 52 into one or more pieces defined by the serrated pattern, thereby allowing for easy removal of assembly 52 from tooth 10.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. An orthodontic apparatus for attaching to a tooth comprising:
a printed assembly made to conform to the tooth, a separation line or zone defined in the printed assembly having a configuration adapted to facilitate removal of the printed assembly from the tooth; and
an orthodontic fixture attached to or integral with the printed assembly to enable its use in an orthodontic procedure,
where the assembly has a lower edge and where the separation line or zone comprises an open slot defined in a cross configuration into the printed assembly with a vertical slot and intersecting horizontal slot, the vertical slot extending to the lower edge of the assembly.

2. The orthodontic apparatus of claim 1 where the assembly is comprised of at least two separate portions, a buccal portion conformed to the tooth and a lingual portion conformed to the tooth, the separation line or zone being defined on at least one of the two separate portions.

3. The orthodontic apparatus of claim 1 further comprising a three dimensional structural fixture defined in the printed assembly for engagement with a tool to facilitate removal of the printed assembly from the tooth.

4. The orthodontic apparatus of claim 3 configured to be removed by means of pliers and where the three dimensional structural fixture defined in the printed assembly for engagement with a tool to facilitate removal of the printed assembly from the tooth comprises a lip for engagement with the pliers.

5. The orthodontic apparatus of claim 3 configured to be removed by means of pliers and where the three dimensional structural fixture defined in the printed assembly for engagement with a tool to facilitate removal of the printed assembly from the tooth comprises an indent for engagement with the pliers.

6. A method of removing a printed assembly included as part of an orthodontic apparatus attached to and conformed to a tooth comprising:
manipulating a separation line or zone predefined in a printed assembly disposed on the tooth to detach at least part of the printed assembly from the tooth by separating the part of the printed assembly along the separation line or zone; and
removing the separated part of the printed assembly from the tooth,
where the assembly has a lower edge and where manipulating the separation line or zone comprises manipulating an open slot defined in a cross configuration into the printed assembly with a vertical slot and intersecting horizontal slot, the vertical slot extending to the lower edge of the assembly.

7. The method of claim 6 where manipulating the separation line or zone predefined in the printed assembly opens the printed assembly to allow the printed assembly to be detached and lifted off the tooth.

8. The method of claim 6 where manipulating the separation line or zone predefined in the printed assembly disassembles the printed assembly into separate portions, each of which are separately removed from the tooth.

9. The method of claim 6 where manipulating the separation line or zone predefined in the printed assembly opens the printed assembly to allow the printed assembly to be detached and lifted off the tooth and disassembles the printed assembly into separate portions, each of which are separately removed from the tooth.

* * * * *